(12) United States Patent
Humfeld (10) Patent No.: US 10,315,341 B2
(45) Date of Patent: Jun. 11, 2019

(54) SYSTEMS AND METHODS FOR CURING COMPOSITE STRUCTURES

(71) Applicant: The Boeing Company, Huntington Beach, CA (US)

(72) Inventor: Keith Daniel Humfeld, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 1387 days.

(21) Appl. No.: 14/494,478

(22) Filed: Sep. 23, 2014

(65) Prior Publication Data

US 2016/0193755 A1 Jul. 7, 2016

(51) Int. Cl.
*B29C 35/04* (2006.01)
*B29L 31/30* (2006.01)

(52) U.S. Cl.
CPC ..... *B29C 35/041* (2013.01); *B29L 2031/3082* (2013.01)

(58) Field of Classification Search
CPC ............................ B29C 35/041; B29C 35/045
USPC ................................................... 264/552, 570
See application file for complete search history.

(56) References Cited

U.S. PATENT DOCUMENTS

| 2008/0211145 A1* | 9/2008 | Graham | B29C 33/405 264/570 |
|---|---|---|---|
| 2009/0309249 A1* | 12/2009 | Inston | B29C 35/0288 264/40.6 |
| 2013/0313760 A1* | 11/2013 | Kondo | B29C 35/0227 264/500 |

* cited by examiner

*Primary Examiner* — Christina A Johnson
*Assistant Examiner* — Xue H Liu
(74) *Attorney, Agent, or Firm* — DASCENZO Intellectual Property Law, P.C.

(57) ABSTRACT

Systems are disclosed for curing composite parts within a container, wherein a pressurized environment may be created via a body of water. Disclosed systems may include the container, a heating system, and a mechanism for raising and/or lowering the container within the body of water. The container may include one or more rigid walls, one or more non-rigid walls, and/or one or more port holes extending through one or more of the rigid walls and/or non-rigid walls. Methods of curing composite parts using such systems are also disclosed. Methods may include providing a container having a cavity configured to receive a composite part, thermally coupling a heating system to the container, inserting the composite part into the cavity, submerging the container under a depth of external liquid, flowing a volume of fluid into the cavity, heating the volume of fluid, thereby curing the composite part.

11 Claims, 6 Drawing Sheets

SYSTEMS AND METHODS FOR CURING COMPOSITE STRUCTURES

FIELD

The present disclosure relates to systems and methods for curing composite structures.

BACKGROUND

Composite parts are used in a wide variety of fields, such as for vehicles, aircraft, aerospace applications, transportation, and the like. Composite parts are cured before the part is used in such applications. Typically, curing is performed in large, pressurized ovens, referred to as autoclaves. Autoclaves are large enough to completely enclose the composite part being cured in order to apply a sufficient pressure surrounding the composite part for curing. Thus, autoclave walls are built to withstand large pressure differentials on either side of the autoclave walls and are typically thick metal structures (e.g., the autoclave walls must withstand the pressure differential between atmospheric pressure outside of the autoclave and the pressure within the autoclave cavity where the composite part is being cured). Due to the requirements for autoclave performance and the size of many composite parts, autoclaves can be very expensive to build, and are limited in size (e.g., scaling up to larger sizes can be prohibitively expensive or impractical). Because of this, many composite parts are cured in sections, and later spliced together to form a completed part or vehicle. For example, the barrel of a passenger aircraft may be cured in sections because the cost of building an autoclave large enough to cure the entire barrel at once may be prohibitive.

SUMMARY

Disclosed systems and methods for curing composite parts may include containers that are configured to be placed in a high-pressure environment. Thus, contrary to conventional autoclaves (which are subject to atmospheric pressure on the outside and pressurized on the inside), the disclosed containers need not be constructed in a way to withstand such large pressure differentials because they may be configured to experience equal pressures on the outside and inside of the container. In this manner, a composite part may be subjected to sufficient pressure and heat to cure the part, with the disclosed containers being more amenable to scaling up to accommodate larger composite parts because of the reduced requirements for the disclosed containers as compared to conventional autoclaves.

Disclosed systems for curing one or more composite parts may include a container having at least one wall, a pressurized environment created by a volume of liquid, and a heating system configured to be thermally coupled to the container. The container may define a cavity being configured to receive one or more composite parts therein. The cavity may be filled with a volume of fluid that may surround the one or more composite parts. The heating system may be configured to raise the temperature of at least a portion of the volume of fluid from a first temperature to a curing temperature sufficient to cure the composite part, the curing temperature being higher than the first temperature. The container may be configured to be moved from a first position at least partially outside the pressurized environment to a second position within the pressurized environment, wherein, in the second position, the volume of liquid surrounds the container and applies a predetermined pressure to the composite part, such as by pressurizing the volume of fluid within the cavity. The heating system may be configured to heat the volume of fluid before and/or after it enters the cavity.

Disclosed methods of curing a composite part may include providing a container with at least one wall defining a cavity configured to receive a composite part, thermally coupling a heating system to the container, the heating system being configured to heat a volume of fluid, inserting the composite part into the cavity, flowing the volume of fluid into the cavity, submerging the container under a depth of external liquid, heating the volume of fluid via the heating system to a temperature sufficient to cure the composite part, and curing the composite part. The volume of fluid may be flowed into the cavity before and/or after submerging the container under a depth of external liquid. In some methods, the volume of fluid may flow into the cavity while the container is in the first position, at least partially outside the pressurized environment. In some methods, the volume of fluid may be stored outside of the cavity, and flow into the cavity to pressurize the cavity once the container is submerged (e.g., in the second position).

DESCRIPTION

Figure 1:
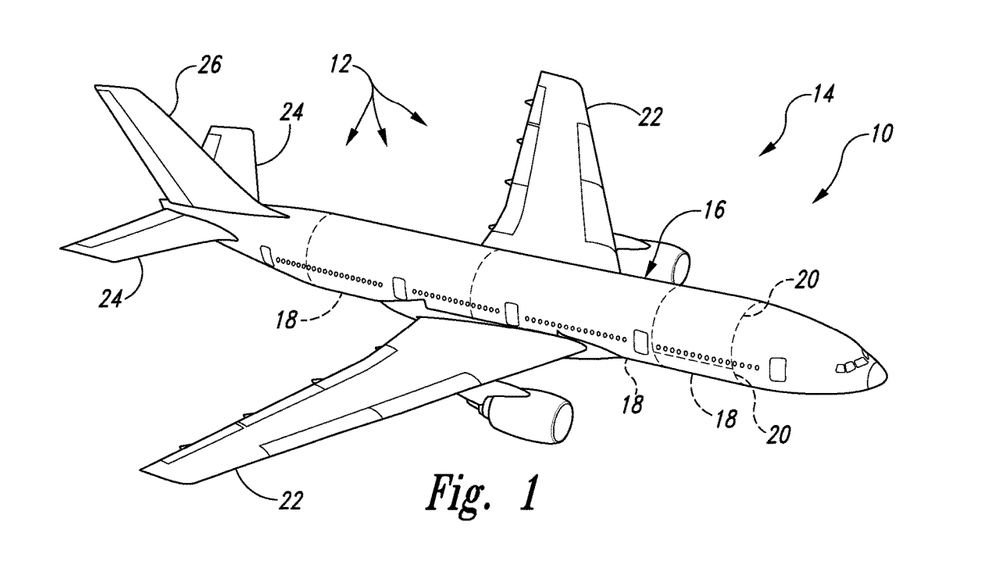
FIG. 1 is a perspective view of an illustrative, non-exclusive example of an aircraft that may include one or more composite parts.

Methods and systems for curing one or more composite parts, as well as the resulting composite parts themselves and apparatuses constructed of said composite parts, are disclosed herein. In FIG. 1, an example of an apparatus 10 that may be constructed from one or more composite structures 12 is provided in the form of an aircraft 14; however, other apparatuses 10 are within the scope of the present disclosure, and the present disclosure is not limited to aircraft and aircraft applications. For example, as illustrative, non-exclusive examples, other apparatuses 10 that may be constructed of composite structures 12 include (but are not limited to) spacecraft, watercraft, land vehicles, wind turbines, structural towers and masts, bridges, etc. Moreover, aircraft 14 may take any suitable form, including commercial aircraft, military aircraft, private aircraft, or any other suitable aircraft. While FIG. 1 illustrates aircraft 14 in the form of a fixed wing aircraft, other types and configurations of aircraft are within the scope of aircraft 14 according to the present disclosure, including (but not limited to) helicopters.

Aircraft 14 may include a fuselage 16, which may also be referred to herein as a barrel 16, and which generally corresponds to the main body of aircraft 14 for holding passengers, crew, cargo, and/or equipment, for example, depending on the particular configuration and/or function of an aircraft 14. Typically, although not required, the fuselage 16 of an aircraft 14 is elongate and somewhat cylindrical or tubular. In some embodiments, the fuselage 16 may be constructed of multiple sections 18 that are longitudinally spaced along the fuselage 16 and operatively coupled together to define the fuselage 16. As used herein when referencing an aircraft 14, a fuselage 16, and/or a corresponding composite structure 12, the longitudinal direction refers to the fore-aft direction, corresponding to a longitudinal, or long, axis, of the fuselage 16. Additionally, the terms "inner" and "outer" when used in connection with an aircraft 14, a fuselage 16, and/or a corresponding composite structure 12 refer to the radially inward side and the radially outward side, respectively, of the corresponding composite part. Accordingly, the outer side of a fuselage 16 or a component part thereof generally faces the environment surrounding fuselage 16, and the inner side of a fuselage 16 or a component part thereof generally faces the internal volume that is defined by the fuselage 16. Similar relative terms may be used with respect to composite structures 12 other than fuselages 16 and with respect to apparatuses 10 other than aircraft 14.

In FIG. 1, three fuselage sections 18 are indicated schematically; however, any number or size and shape of fuselage sections 18 may be used to construct a fuselage 16. Fuselage sections 18 additionally or alternatively may be referred to as sections 18 or barrel sections 18 of a fuselage 16, with each barrel section 18 generally defining a length of the fuselage 16. Additionally or alternatively, as schematically illustrated in FIG. 1, a section 18 may include, or be constructed of, more than one subsection 20. In the schematically illustrated and optional example of FIG. 1, a section 18 is shown schematically and optionally to include an upper subsection 20 and a lower subsection 20; however, a section 18 may be constructed of any suitable number, configuration, and placement of subsections 20, including no subsections 20 at all.

Aircraft 14 also may include wings 22, horizontal stabilizers 24, and a vertical stabilizer 26, each of which may be constructed as a unitary structure or in subsections that are subsequently assembled together. One or more of a fuselage 16, a fuselage section 18, a fuselage subsection 20, a wing 22, a horizontal stabilizer 24, a vertical stabilizer 26, or a structural subsection thereof may be constructed of and/or may be described as a composite structure 12 according to the present disclosure.

Figure 2:
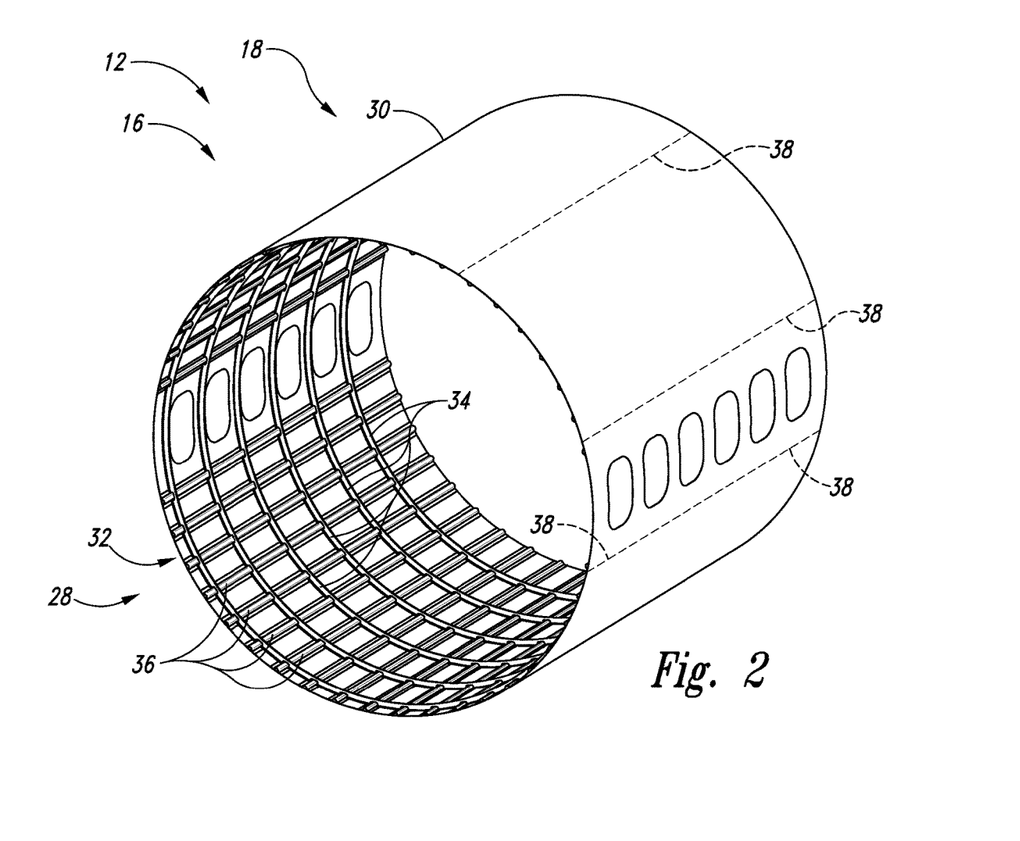
FIG. 2 is an isometric view of an illustrative, non-exclusive example of a composite part in the form of a barrel section of an aircraft.

Composite structures 12 according to the present disclosure generally encompass structures that are defined by a structural frame 28 and a skin 30 (as illustrated in FIG. 2) that is operatively coupled to and supported by the structural frame 28. FIG. 2 depicts an illustrative, non-exclusive example of a composite structure 12 in the form of a barrel section 18 of a fuselage 16 of an aircraft 14. The skin 30 may be described as defining the outer shape of the fuselage 16. As indicated in FIG. 2, structural frames 28 include a plurality of stiffeners 32 operatively coupled to the inner side of the skin 30. In the example of fuselage 16, the stiffeners 32 include a plurality of frame members, or frames, 34 that are operatively coupled to and that extend circumferentially around the inner side of the skin 30 and that are spaced longitudinally along the fuselage 16. The stiffeners 32 may also include a plurality of stringers 36 that are operatively coupled to and that extend longitudinally along the inner side of the skin 30 and that are spaced circumferentially around the fuselage 16. In some embodiments of composite structures 12, although not required, the skin 30 may be constructed of a plurality of skin segments 38 that collectively define the skin 30, or at least a portion of the skin 30 of a composite structure 12. Of course, the barrel section 18 shown in FIG. 2 is merely an example, and in no way limits the composite parts (including other embodiments of barrel sections) that may be cured according to the methods and systems of the present disclosure.

Turning now to FIGS. 3-8, illustrative non-exclusive examples of systems and/or containers for curing one or more composite parts are illustrated. Where appropriate, the reference numerals from the schematic illustrations of FIGS. 3-8 are used to designate corresponding parts of other figures; however, the examples of FIGS. 3-8 are non-exclusive and do not limit disclosed systems or containers for curing one or more composite parts to the illustrated embodiments. That is, each of FIGS. 3-8 are not limited to the specific embodiments of the illustrated systems or containers and may incorporate any number of the various aspects, configurations, characteristics, properties, etc. that are illustrated in and discussed with reference to the schematic representations of any of the other figures, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to each exemplary figure however, it is within the scope of the present disclosure that the previously discussed features, variants, etc. may be utilized with each of the illustrated systems and/or containers.

The systems for curing composite parts described herein and illustrated in FIGS. 3-8 may be less limited in size as compared to a conventional autoclave because, unlike with a conventional autoclave, the presently disclosed systems may experience little to no pressure differential across the system's container walls. Accordingly, in some examples, an entire fuselage could be cured at one time using the described systems. For example, disclosed systems may include a container that is up to 90 feet (27.5 meters) long, or longer, to contain an entire fuselage or relatively larger fuselage sections. Such sizes may be cost-prohibitive to create in a conventional autoclave.

Figure 3:
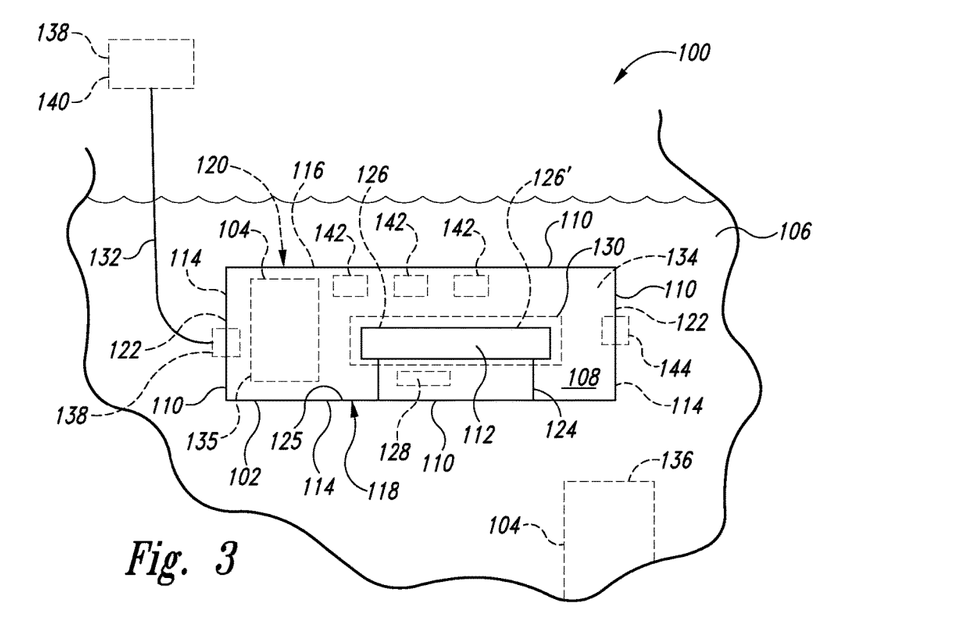
FIG. 3 is a schematic representation of illustrative, non-exclusive examples of a system for curing one or more composite parts according to the present disclosure.

FIG. 3 shows a schematic representation of illustrative, non-exclusive examples of systems 100 for curing one or more composite parts 112, such as composite structures 12 (shown in FIGS. 1 and 2). Systems 100 may generally include a container 102, a heating system 104, and a volume of liquid 106 that may create a high-pressure environment (also referred to herein as a pressurized environment) surrounding and within container 102. A high-pressure environment may be any environment having a pressure greater than 1 atmosphere (atm). In some examples, a high-pressure environment is any environment (such as a depth of liquid) having a pressure at least as high as a desired pressure for curing composite parts (e.g., at least 50 psi, at least 100 psi, and/or greater than 100 psi). Volume of liquid 106 may also be referred to herein as an external liquid 106, or a depth of external liquid 106. Volume of liquid 106 is generally external to container 102, but a portion of volume of liquid 106 may flow into container 102 (e.g., volume of liquid 106 may be a body of water, wherein a portion of the body of water flows into container 102 to fill a cavity 108 formed within container 102). Thus, the internal pressure within cavity 108 may be substantially equal to the external pressure outside of container 102 (e.g., the pressure at a predetermined depth within volume of liquid 106). In this manner, some disclosed systems 100 have substantially no pressure difference between the inside and outside of container 102. While volume of liquid 106 is described as creating the pressurized environment, in other examples, any pressurized environment that will apply a desired pressure to container 102 can be used with the systems and methods described herein.

Container 102 may include one or more walls 110 defining cavity 108. Container 102 may include one, two, three, four, five, six, seven, eight, nine, or ten or more walls 110, arranged in any configuration. Generally, walls 110 may include one or more rigid walls 114 and/or one or more non-rigid walls 116. In some examples, all walls 110 may be rigid walls 114. In some examples, all walls 110 may be non-rigid walls 116. In some examples, walls 110 may include a combination of one or more rigid walls 114 and one or more non-rigid walls 116. For example, container 102 may include a plurality of rigid walls 114 and one non-rigid wall 116. Rigid walls 114 may be constructed of any suitable material. For example, rigid walls 114 may be constructed of metal, wood, plastic, ceramic, and/or combinations thereof. Non-rigid walls 116 may be flexible or semi-flexible and may be constructed of any suitable material. For example, non-rigid walls 116 may be constructed of metal (e.g., thin metal sheets), wood, plastic, fabric, and/or combinations thereof.

In some examples, one or more walls 110 may be removable from container 102 in order to access cavity 108. Additionally or alternatively, access ports or doors may be formed in one or more walls 110 in order to provide access to cavity 108, and/or one or more walls 110 may be configured to open and close (e.g., one or more walls 110 may have a hinged, sliding, or other suitable relationship with other walls 110) in order to provide selective access to cavity 108.

In some examples, walls 110 may be arranged such that a plurality of walls 110 form side walls 122 that are coupled to one another and capped on opposite ends. For example, side walls 122 may be enclosed on one side by a support wall 118 and on an opposing side by a moveable wall 120. Support wall 118 may be positioned on a lower side of container 102 and may be configured to support the composite part 112 and any associated tooling within cavity 108. Support wall 118 may be a rigid wall 114. Moveable wall 120 may be selectively moveable with respect to container 102. For example, moveable wall 120 may be removable, and/or may be configured to slide, hinge open, and/or may include a portion thereof that is configured to slide or hinge open in order to provide access to cavity 108. Moveable wall 120 may be positioned on an upper side of container 102, but other configurations are also possible. Moveable wall 120 may be a non-rigid wall 116 in some examples. In some specific examples, container 102 may be a rectangular container having four rigid side walls 122 and a rigid lower support wall 118 and an upper moveable wall 120 made of a non-rigid material, such as a flexible polymer or fabric material. While one or more of the walls 110 of a given container 102 may be rigid walls 114, rigid walls 114 need not be rigid enough or strong enough to support a pressure differential across them, but may be in some examples. In one specific example, container 102 may be similar to a cargo shipping container with, for example, a flexible upper wall.

Cavity 108 may be configured to receive composite part 112. In other words, container 102 may be configured such that cavity 108 is large enough to accommodate composite part 112 within cavity 108. Composite part 112 may be any composite part for any machine, vehicle, or structure, and may include a plurality of composite parts 112. For example, composite part 112 may include one or more examples of composite structures 12 discussed in connection with FIGS. 1-2. Composite part 112 may include an entire barrel section of an aircraft, an entire barrel of an aircraft, a one-piece composite bridge, and/or a hull, such as an entire hull for a tanker, aircraft carrier, or other vehicle. If composite part 112 includes a plurality of composite parts, such plurality may include a portion of or every part needed for a particular vehicle, and/or a plurality of the same part (e.g., a batch of parts). Container 102 may be configured to receive such a plurality of composite parts 112 simultaneously.

One or more composite parts 112 may be locked in place within cavity 108, such as with a locking mechanism 124. Locking mechanism 124 may be positioned within cavity 108 of container 102 and may be configured to hold composite part 112 in place within cavity 108 such that composite part 112 is at least substantially immobile with respect to container 102. Locking mechanism 124 may include one or more clamps, buckles, snaps, locks, straps, grooves, pins, interlocking components, and/or any other mechanism for temporarily securing composite part 112 in place within cavity 108. Additionally or alternatively, locking mechanism 124 may include a table, surface, shelf, fixture, or the like to support composite part 112 and hold it up and away from an interior lower surface 125 of cavity 108.

Composite part 112 may be "bagged," or surrounded by a vacuum bag 126 while within container 102. For example, composite part 112 may already be enclosed by vacuum bag 126 when placed within cavity 108 in some examples. Additionally or alternatively, vacuum bag 126 may be placed around composite part 112 once the composite part is already positioned within cavity 108. In some examples, composite part 112 is not bagged. In other examples, composite part 112 may be bagged twice. For example, a first vacuum bag 126 may be placed around composite part 112, and then a second vacuum bag 126' may be placed around first vacuum bag 126. Systems 100 also may include a vacuum system 128 within cavity 108 of container 102, where vacuum system 128 may be configured to compact composite part 112 within cavity 108 (e.g., vacuum system 128 may be configured to apply a suction force within vacuum bag 126, thereby compressing vacuum bag 126 and composite part 112).

Composite part 112 may optionally be at least partially surrounded by a heating blanket 130. In examples where composite part 112 is bagged, heating blanket 130 may be positioned around vacuum bag 126. Heating blanket 130 may be a component of heating system 104. Additionally or alternatively, heating blanket 130 may be filled with gas or liquid configured to aid in applying heat to composite part 112.

At a given depth under a liquid, the weight of liquid above exerts a pressure on whatever object is held at depth, where the pressure increases at greater depths. Thus, volume of liquid 106 may create a pressurized environment to receive and surround container 102, wherein the deeper container 102 is submerged within volume of liquid 106, the greater the pressure exerted on container 102 and/or one or more composite parts 112 therein. Walls 110 of container 102 may be configured such that pressure exerted on container 102 from volume of liquid 106 is exerted equally on the exterior of container 102 and within cavity 108. For example, container 102 may include at least one non-rigid wall 116 that flexes and transmits pressure from volume of liquid 106 to a volume of fluid 134 within cavity 108. In some examples, a portion of volume of liquid 106 may be permitted to flow into cavity 108 to equalize pressure within cavity 108 and outside of container 102.

Container 102 may be configured to be moved to various different positions when used within systems 100. For example, container 102 may be configured to be moved from a first position at least partially outside the pressurized environment (e.g., FIG. 4) to a second position within the pressurized environment (e.g., wherein container 102 is submerged in volume of liquid 106, as in FIG. 3). At various points during use, container 102 may be completely outside of volume of liquid 106, may be positioned on the surface of volume of liquid 106, may be partially submerged within in volume of liquid 106, or may be completely submerged within volume of liquid 106. In the second configuration (FIG. 3), container 102 may be completely submerged and volume of liquid 106 may surround container 102 and apply a predetermined pressure to composite part 112 due to the resulting pressurized environment creating an equal pressure within cavity 108 and outside container 102. Systems 100 may include a mechanism for raising and/or lowering container 102 within volume of liquid 106, as will be described in further detail in connection with FIG. 4.

Volume of liquid 106 may be a depth of water or another liquid, a portion of a river, sea, canal, lake, or ocean, a man-made hole filled with water, a large container or pool filled with water, or any other body of water or other liquid that may be configured to create a pressurized environment for presently disclosed systems 100. Volume of liquid 106 may have a depth sufficient to apply a predetermined pressure on a container submerged in volume of liquid 106. For example, volume of liquid 106 may have a depth of at least 10 feet (3.05 meters), at least 50 feet (15.24 meters), at least 100 feet (30.48 meters), at least 150 feet (45.72 meters), at least 170 feet (51.82 meters), at least 200 feet (60.96 meters), at least 250 feet (76.2 meters), at least 300 feet (91.44 meters), and/or greater than 300 feet (91.44 meters).

Heating system 104 may include a heater located on or within container 102, such as an on-board heating unit 135 positioned within cavity 108, and/or heating system 104 may include a separate heater located apart from container 102, such as an external heating unit 136, which may be positioned within volume of liquid 106, remote from container 102. In examples wherein systems 100 include on-board heating unit 135, on-board heating unit 135 may be a fixed heater unit 135 that is temporarily or permanently fixed to container 102 (e.g., at least a portion of heating system 104 may be integrated with container 102). On-board heating unit 135 may be fixed to container 102 (e.g., fixed to an outside surface of one or more walls 110 of container 102), or on-board heating unit 135 may be fixed partially or entirely within cavity 108 in some examples. In examples where heating system 104 includes external heating unit 136, container 102 may be thermally coupled to external heating unit 136 once container 102 is submerged within volume of liquid 106. For example, external heating unit 136 may be positioned within volume of liquid 106 at or near the depth at which container 102 ultimately will be submerged, to facilitate coupling with container 102. One or more walls 110 of container 102 may be thermally insulated to increase thermal efficiency and reduce the required energy expenditure of heating system 104 (e.g., to prevent heating the liquid surrounding container 102).

Heating system 104 may be thermally coupled to container 102 such that heating system 104 is configured to raise the temperature of at least a portion of a volume of fluid 134 within container 102 from a first temperature to a curing temperature sufficient to cure composite part 112. The curing temperature will generally be higher than the first temperature. Heating system 104 may be configured to heat a liquid, a gas, a tool, and/or a heating blanket. For example, heating system 104 may be configured to heat at least a portion of the volume of fluid 134, where the volume of fluid 134 is contained within cavity 108 and surrounds composite part 112. Volume of fluid 134 may be a liquid, a gas, or a combination thereof. In some examples, at least a portion of volume of fluid 134 may be heated by heating system 104 before it enters cavity 108 of container 102. Additionally or alternatively, at least a portion of volume of fluid 134 may be heated by heating system 104 after volume of fluid 134 enters cavity 108 of container 102. Volume of fluid 134 may include, for example, a portion of volume of liquid 106 that flows into cavity 108. Additionally or alternatively, volume of fluid 134 may include a volume of gas that flows into cavity 108. Volume of fluid 134 may be divided so that only a portion of volume of fluid 134 adjacent part 112 is heated. For example, volume of fluid 134 may be divided by flowing a portion of the fluid into second vacuum bag 126' that may surround vacuum bag 126, where only the fluid within second vacuum bag 126' is heated.

In some examples, moving container 102 from a position outside of or partially within volume of liquid 106 to a submerged position within volume of liquid 106 may cause volume of fluid 134 to flow into cavity 108. For example, partially submerging container 102 in volume of liquid 106 may allow for a portion of volume of liquid 106 to flow into cavity 108 through an opening in one or more walls 110. Additionally or alternatively, container 102 may be partially submerged with moveable wall 120 removed from container 102, thereby allowing a portion of volume of liquid 106 to flow into container 102. In some examples, volume of fluid 134 may include a volume of gas that is at least partially stored outside of cavity 108 and forced into cavity 108 once container 102 is placed in the pressurized environment (e.g., submerged within volume of liquid 106). For example, one or more bladders 164 (or other fillable structures) containing a volume of fluid 134 (e.g., a volume of gas) located externally to container 102 may be configured to be in flow communication with cavity 108 such that a pressurized environment places pressure on bladders 164, thereby forcing the volume of gas to flow from bladders 164 into cavity 108. Volume of fluid 134 may fill cavity 108, thereby surrounding composite part 112, imparting both pressure and a sufficiently high temperature to cure composite part 112.

Volume of fluid 134 may flow from outside container 102 into cavity 108 of the container. For example, at least a portion of volume of fluid 134 may be configured to flow through at least one port hole 144 formed in container 102. In some examples, at least a portion of volume of fluid 134 may be allowed to flow through at least one port hole 144 when container 102 is at least partially placed in the pressurized environment (e.g., at least partially submerged in volume of liquid 106). In some examples, volume of fluid 134 may be configured to pressurize cavity 108. For example, volume of fluid 134 may be pressurized to at least 50 pounds per square inch (psi) (344 Pascals (Pa)), at least 60 psi (414 Pa), at least 70 psi (483 Pa), at least 80 psi (552 Pa), at least 90 psi (621 Pa), at least 100 psi (689 Pa), at least 110 psi (758 Pa), at least 120 psi (827 Pa), at least 130 psi (896 Pa), at least 140 psi (965 Pa), and/or at least 150 psi (1,034 Pa) when container 102 is within the pressurized environment (e.g., at a predetermined depth within volume of liquid 106).

Systems 100 may include a power source 138 electrically coupled to heating system 104, and/or a support cable 132 (also referred to herein as a tether 132). Power source 138 may be located separate from container 102, coupled to container 102, and/or located within container 102. Power source 138 may include one or more batteries, generators, engines, motors, energy storage cells, fuel cells, wires, cables, power lines, and/or any other device configured to deliver power to systems 100, such as to heating system 104 and/or vacuum system 128. Support cable 132 may, in some examples, be configured to deliver power to heating system 104 and/or vacuum system 128 from a remotely located power source 140. Additionally or alternatively, support cable 132 may be configured to control raising and/or lowering of container 102 within volume of liquid 106. Information and/or data from components of systems 100 also may be sent to remote monitors via support cable 132. For example, systems 100 may include one or more temperature and/or pressure sensors that may be configured to send data via support cable 132. In some examples, a temperature sensor may be configured to monitor temperature conditions within cavity 108 of container 102 and deliver information regarding said temperature conditions to a remote location. Similarly, a pressure sensor may be configured to monitor pressure conditions within cavity 108 of container 102 and deliver information regarding said pressure conditions to a remote location.

Additionally or alternatively, power source 138 may be configured to deliver power to one or more fluid circulators 142 in systems 100 (e.g., power source 138 may be electrically coupled to one or more fluid circulators 142). Fluid circulators 142 may be positioned within cavity 108 and/or coupled to one or more walls 110 of container 102. Fluid circulators 142 may be configured to circulate at least a portion of the volume of fluid 134 within cavity 108 of container 102. Such circulation may help to distribute temperature evenly within cavity 108. Fluid circulators 142 may include, for example, at least one of a fan and/or at least one propeller or impeller. One or more fluid circulators 142 may be positioned near a port hole 144 to help encourage fluid to move through the port hole 144 and into cavity 108. Additionally or alternatively, one or more fluid circulators 142 may be positioned near an on-board heating unit 135 to help distribute fluid warmed by the heating unit 135. In some examples, one or more fluid circulators 142 may be positioned near composite part 112 to ensure movement of at least a portion of volume of fluid 134 around composite part 112.

Figure 4:
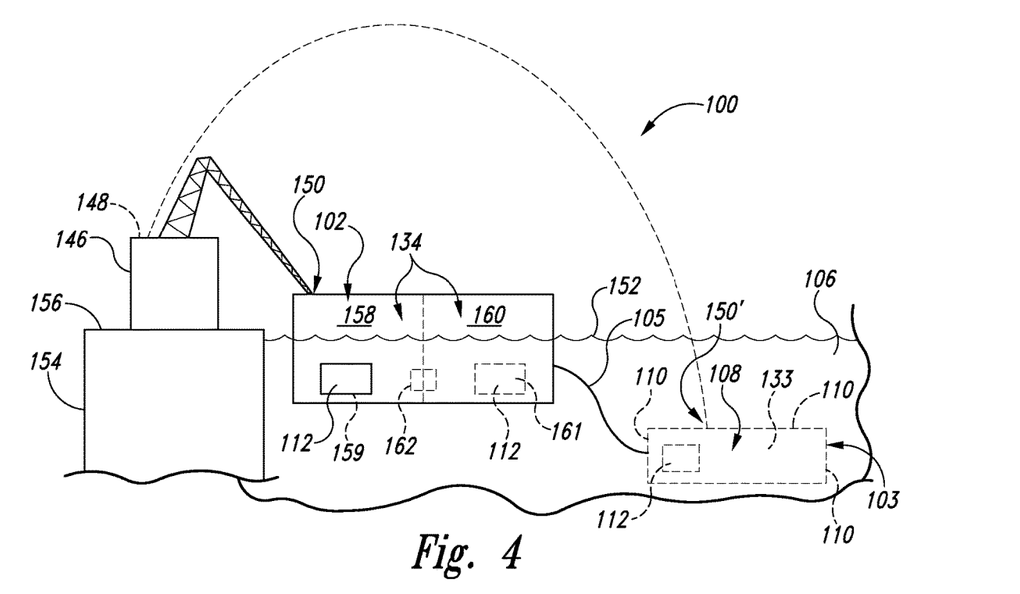
FIG. 4 is a schematic representation of illustrative, non-exclusive examples of another system for curing one or more composite parts according to the present disclosure.

FIG. 4 schematically illustrates further examples of systems 100 for curing a composite part. Systems 100 of FIG. 4 may include some or all of the components illustrated in FIG. 3, many of which are omitted from FIG. 4 and other figures for clarity. Systems 100 may include a container 102, a volume of liquid 106 configured to produce a pressurized environment surrounding container 102, and a mechanism 146 configured to control raising and/or lowering of container 102 within volume of liquid 106. For example, mechanism 146 may be a crane 148 in some systems 100, where crane 148 may include a coupling 150 configured to secure crane 148 to container 102. Mechanism 146 may be configured to prevent container 102 from sinking faster than desired within volume of liquid 106. Additionally or alternatively, mechanism 146 may be configured to stop container 102 from sinking deeper than desired within volume of liquid 106 (e.g. may prevent container 102 from sinking beyond a predetermined depth within volume of liquid 106), and may raise container 102 back to a surface 152 of volume of liquid 106 when a composite part (e.g., composite part 112) contained within container 102 has been cured. Mechanism 146 also may be configured to lift container 102 entirely out of volume of liquid 106.

While FIG. 4 shows just one mechanism 146 for raising and/or lowering container 102, more than one mechanism 146 may be included in a given system 100. For example, some systems 100 may include two mechanisms 146, positioned at opposing ends of container 102 for balanced raising and lowering of container 102. In some examples, a single mechanism 146 may include more than one coupling 150, thereby being attached to container 102 at more than one location. In some examples, systems 100 may include a first mechanism to control lowering of container 102 into volume of liquid 106 and a second mechanism for raising container 102 out of volume of liquid 106 after curing.

In some examples, systems 100 may include a support structure 154, such as a dock, pier, shore, cliff, boat, and/or other support structure or platform. Support structure 154 may be located on/in volume of liquid 106 and may be configured to support mechanism 146 for raising and/or lowering container 102. In some examples, support structure 154 may be positioned on land, such as near an edge near an abrupt drop into a body of water or other liquid. While not drawn to scale, support structure 154 may include a support surface 156 that may be configured to support container 102 when it is removed from volume of liquid 106. Additionally or alternatively, support surface 156 may be configured to receive and support a composite part 112 from within container 102. For example, mechanism 146 may be configured to remove a cured composite part 112 from within container 102 and place the composite part 112 on support surface 156. Similarly, support surface 156 may be configured to support the composite part 112 before curing, and mechanism 146 may be configured to place composite part 112 within container 102.

Cavity 108 of container 102 may include two or more cavities, or cure chambers within container 102. For example, cavity 108 may be split into two sections, such as first cure chamber 158 and second cure chamber 160. First cure chamber 158 and second cure chamber 160 may be the same size (e.g., cavity 108 may be split in half), or one may be larger than the other. Similarly, cavity 108 may be split into more than two sections in some examples. First cure chamber 158 may be selectively in fluid communication with second cure chamber 160, such as via an interface 162. Interface 162 may allow for fluid within cavity 108 to pass from first cure chamber 158 to second cure chamber 160 and/or vice versa. In some examples, interface 162 may be changeable from a first configuration that allows passage of fluid between first cure chamber 158 and second cure chamber 160 to a second configuration that is sealed, thereby preventing fluid flow from one cure chamber to another.

In examples where container 102 includes more than one cure chamber, a first composite part or parts 159 may be placed within first cure chamber 158, and a second composite part or parts 161 may be placed within second cure chamber 160. In these examples, first composite part(s) 159 within first cure chamber 158 may be cured at a different time than second composite part(s) 161 within second cure chamber 160. For example, volume of fluid 134 may flow into or be placed within first cure chamber 158. Container 102 may be placed at an appropriate depth within volume of liquid 106 such that the desired pressurized environment is created. Volume of fluid 134 may be heated, and first composite part(s) 159 may be cured within first cure chamber 158. After first composite part(s) 159 are cured, the heated volume of fluid 134 may be permitted or forced to flow through interface 162 into second cure chamber 160, and second composite part(s) 161 may be allowed to cure. In some examples, interface 162 may be remotely controlled, such that selective flow communication between first cure chamber 158 and second cure chamber 160 may controlled (e.g., opened and closed) remotely, without removing container 102 from the pressurized environment. Once volume of fluid 134 has been moved into second cure chamber 160, interface 162 may once again be sealed or closed, in order to keep volume of fluid 134 within second cure chamber 160. In this manner, second composite part(s) 161 may be cured, and then container 102 may be removed from volume of liquid 106. In this manner, the volume of fluid 134 required for curing a composite part 112 may be reduced, as the entire cavity 108 need not be filled simultaneously. This configuration also may provide energy benefits, as a smaller volume of fluid 134 is heated.

Additionally or alternatively, systems 100 may include a second container 103. Like container 102, second container 103 may include one or more walls 110 defining a cavity 108, cavity 108 being configured to receive one or more composite parts 112. Second container 103 may be coupled to mechanism 146, such as with coupling 150', which also may be configured to raise and/or lower second container 103. In some examples, a second mechanism may be configured to raise and/or lower second container 103. Second container 103 may contain a second volume of fluid 133 within cavity 108 that may be heated in order to cure composite part 112 within second container 103. Container 102 and second container 103 may each be configured to be moved into different configurations or positions, such as being configured to be moved from a first configuration at or near surface 152 of volume of liquid 106 to a second configuration at a predetermined depth, submerged in volume of liquid 106.

In operation of systems 100, one of container 102 and second container 103 may be submerged within volume of liquid 106. For example, second container 103 may be submerged within volume of liquid 106, volume of fluid 133 may be heated, and second container 103 may remain submerged until a composite part 112 within second container 103 is cured. Once curing within one of the containers (e.g., second container 103) is complete, the heated fluid (e.g., volume of fluid 133) may be transferred to the other container (e.g., container 102). For example, volume of fluid 133 may be transferred to cavity 108 of container 102, to then become volume of fluid 134. In this manner, volume of fluid 134 may be used again to cure another composite part 112 within container 102. Volume of fluid 133 may be transferred at depth within volume of liquid 106, or may be transferred at or near surface 152 of volume of liquid 106. For example, volume of fluid 133 may be transferred from second container 103 to container 102 while both container 102 and second container 103 are submerged within volume of liquid 106. In other examples, volume of fluid 133 may be transferred from second container 103 to container 102 while both container 102 and second container are at or near surface 152, such as by raising second container 103 back to or near surface 152 of volume of liquid 106 before transferring the heated volume of fluid. Systems 100 that include a second container 103 and container 102 where fluid is transferred between the two may include an interface 105 that may be removable and allow for transfer of fluid between container 102 and second container 103.

Figure 5:
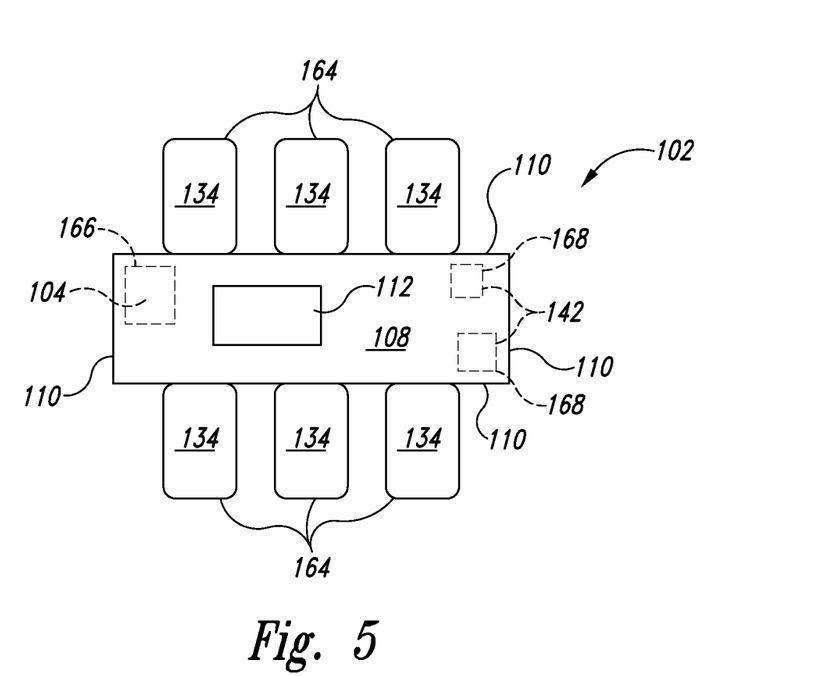
FIG. 5 is a schematic representation of illustrative, non-exclusive examples of containers according to the present disclosure, in a first position, outside of a pressurized environment.
Figure 6:
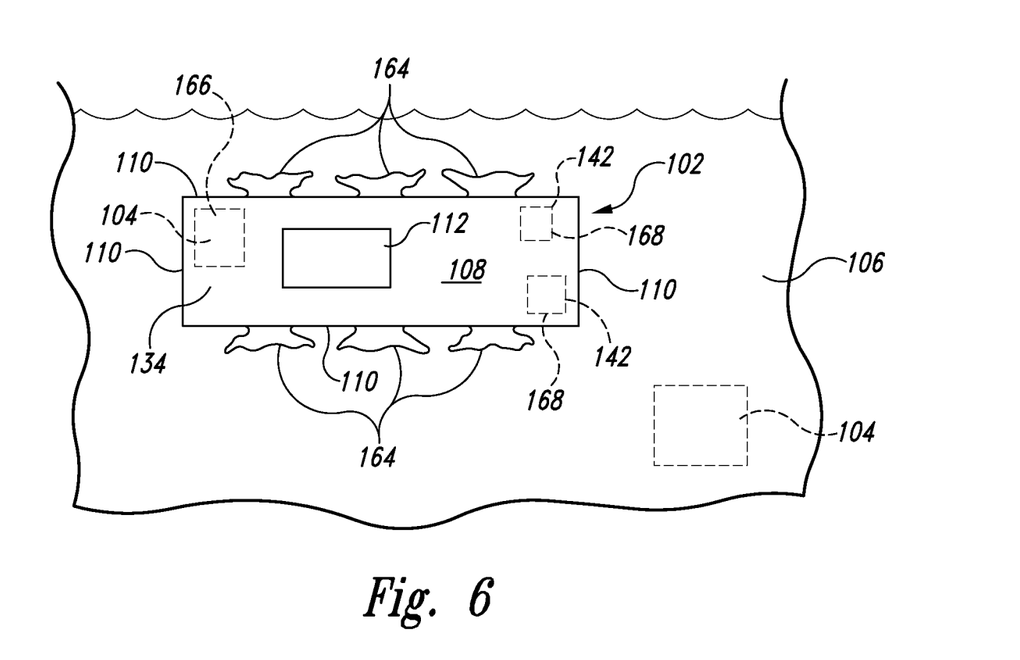
FIG. 6 is a schematic representation of illustrative, non-exclusive examples of containers according to the present disclosure, in a second position, within a pressurized environment.

FIGS. 5-6 show schematic representations of examples of a container 102 in a first configuration outside of a pressurized environment (FIG. 5) and a second configuration within a pressurized environment (FIG. 6), such as at a predetermined depth within a volume of liquid 106. Container 102 may include a plurality of walls 110 that define a cavity 108. Further, container 102 may include a plurality of bladders 164. FIGS. 5-6 show containers 102 having six bladders 164, however, more or fewer bladders 164 are also possible. For example, containers 102 may include at least one, at least two, at least three, at least four, at least five, at least six, at least seven, at least eight, at least nine, at least ten, at least 15, at least 20, at least 50, or more than 50 bladders 164. Bladders 164 may be equally distributed around cavity 108 in some examples. In some examples, bladders 164 all may be positioned on just one wall 110 of container 102. In other examples, bladders 164 may be positioned on two or more walls 110 of container 102. In some examples, each wall 110 of container 102 may include one or more bladders 164. In examples of containers 102 including a plurality of bladders 164, each bladder 164 may be uniformly sized, or one or more bladders 164 may be different sizes from each other. Each bladder 164 may be configured to be in fluid communication with cavity 108 and sealed from the external environment. For example, bladders 164 may be impermeable to fluids, such as liquids and/or gases. In some examples, bladders 164 may be airtight, such that air or another gas may be contained within bladders 164 and prevented from escaping through bladders 164.

Bladders 164 may be flexible and/or compressible, and may be formed of any suitable material, such as polymeric materials. Generally, bladders 164 may be formed of any material capable of preventing gases or other fluids from passing through the material. Specific examples for suitable materials for bladders 164 include thin polymeric sheets, such as 3 mm or 6 mm thick polymeric materials, such as those that may be used as tarps, or other reinforced polymeric materials. Bladders 164 may be inflated or filled with a volume of fluid 134, such as a volume of gas (e.g., air, nitrogen gas, and/or any inert gas) or other compressible fluid. In the second configuration (FIG. 6), container 102 may be placed within a pressurized environment within a volume of liquid 106. Bladders 164 may be configured such that the pressure from volume of liquid 106 causes bladders 164 to be compressed and collapsed, thereby forcing volume of fluid 134 to flow from bladders 164 into cavity 108 to apply pressure to composite part 112 within cavity 108. As with other examples, volume of fluid 134 may be heated while container 102 is positioned within the pressurized environment in order to cure composite part 112. For example, container 102 may include a heating system 104, which may include one or more air heaters 166 and/or one or more fluid circulators 142, such as a fan 168 or other air circulator.

Figure 7:
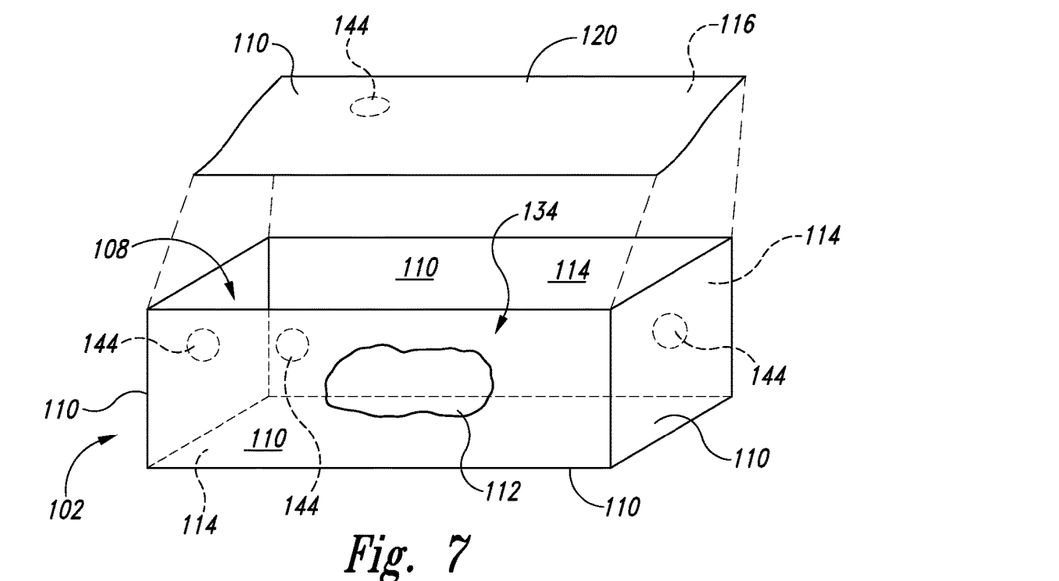
FIG. 7 is a schematic representation of illustrative, non-exclusive examples of containers having a removable non-rigid wall according to the present disclosure.

FIG. 7 shows a schematic representation of examples of a container 102 for curing a composite part 112 placed within a cavity 108, configured to be placed within a pressurized environment, such as a column of water or other liquid. Container 102 may include a plurality of walls 110, one or more of which may each include one or more port holes 144. Port holes 144 may be configured to permit flow of a fluid from outside of container 102 into cavity 108. For example, when opened, port holes 144 may permit water from the pressurized environment (e.g., from a body of water) to flow into cavity 108, filling container 102 and surrounding composite part 112. In some examples, port holes 144 may be selectively sealable, in order to prevent fluid exchange between fluid within cavity 108 and fluid outside of container 102. In this manner, fluid within cavity 108 may be heated without the risk of significant temperature loss with surrounding liquid outside the container.

In the examples of FIG. 7, container 102 is generally formed as a rectangular prism, or rectangular cuboid, however any other suitable configuration is also possible. One or more walls 110 may be moveable, removable, and/or openable to allow placement of composite part 112 within cavity 108. For example, an upper wall 120 may be removable to allow access to cavity 108 for placement and/or removal of composite part 112. In some examples, upper wall 120 may be a non-rigid wall 116, such as a flexible wall. Other walls 110 may be rigid walls 114. In some examples, only one wall 110 of a given container 102 may be a non-rigid wall 116. In other examples, two or more walls 110 of a given container 102 may be non-rigid walls 116. Rigid walls 114 need not be strong enough to withstand pressure differentials between inside cavity 108 and outside of container 102, because when container 102 is placed within a pressurized environment, container 102 may be configured such that the pressure within cavity 108 is equal to or at least approximately equal to the pressure outside of container 102. This equal pressure may be possible due to the flexibility of non-rigid wall 116, in some examples. Movement of non-rigid wall 116 in response to pressure from the pressurized environment may exert pressure on volume of fluid 134 within cavity 108, thereby exerting pressure on composite part 112 within cavity 108.

Figure 8:
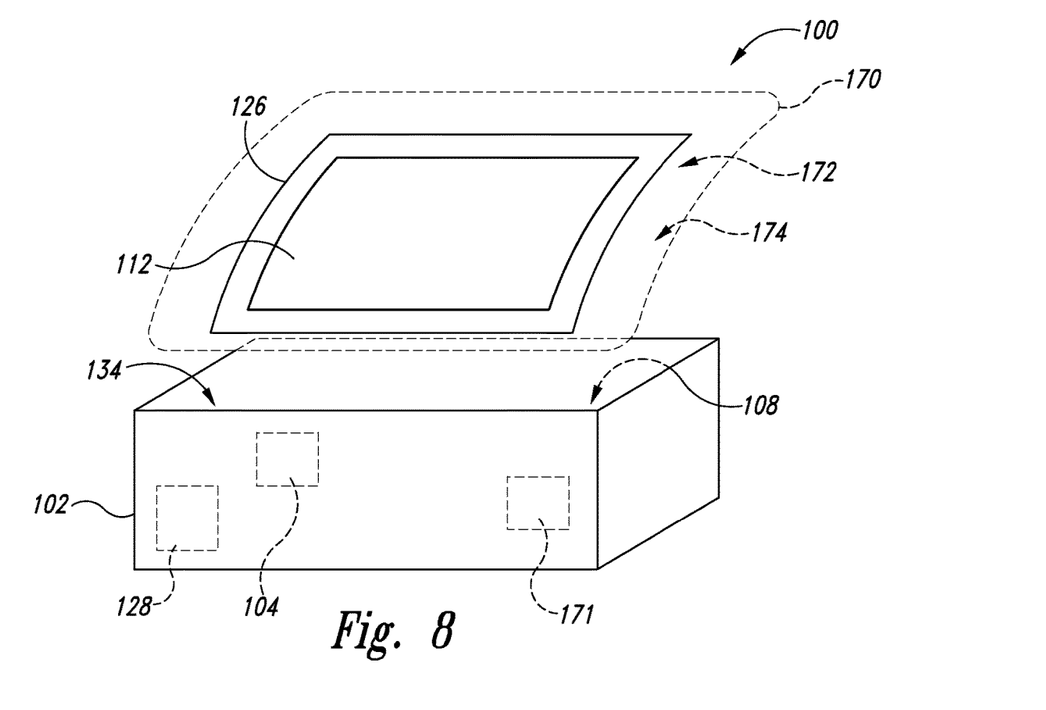
FIG. 8 is a schematic representation of illustrative, non-exclusive examples of bagging configurations for a composite part being placed into a container according to the present disclosure.

FIG. 8 schematically illustrates one possible configuration for the bagging of a composite part 112 being placed within a cavity 108 of a container 102 for curing within a pressurized environment according to the present disclosure. Composite part 112 may be enveloped within a vacuum bag 126. Vacuum bag 126 may be pre-placed around composite part 112 before it is placed within cavity 108, or vacuum bag 126 may be placed around composite part 112 after placement within cavity 108. In some examples, vacuum bag 126 may be configured to seal composite part 112 so that any fluid within cavity 108 does not directly contact composite part 112. In some examples, container 102 may include a vacuum system 128 that may be configured to compact composite part 112 within vacuum bag 126.

Additionally, in some systems 100, a second vacuum bag 170 may be placed around vacuum bag 126 and composite part 112. Second vacuum bag 170 also may be coupled to vacuum system 128, such that vacuum system 128 may be configured to cause both vacuum bag 126 and second vacuum bag 170 to be compressed around composite part 112. In some examples, a second, separate vacuum system 171 may be included within container 102 to compress second vacuum bag 170 around vacuum bag 126 and composite part 112. Second vacuum bag 170 may be larger than composite part 112 and vacuum bag 126 such that a space 172 is formed inside second vacuum bag 170, between it and vacuum bag 126. In these examples, a fluid 174 may be included in space 172 between second vacuum bag 170 and vacuum bag 126. For example, fluid 174 may include a liquid that is sandwiched between second vacuum bag 170 and vacuum bag 126, thereby surrounding composite part 112 without directly contacting it. Fluid 174 may include a portion of volume of fluid 134 and/or a portion of volume of liquid 106, or may be a separate volume of gas or liquid. In some examples, heating system 104 may be thermally coupled to fluid 174 such that fluid 174 is heated directly by heating system 104. In some examples, other fluid 134 within cavity 108 may not be heated by heating system 104, thereby reducing energy consumption of systems 100.

Figure 9:
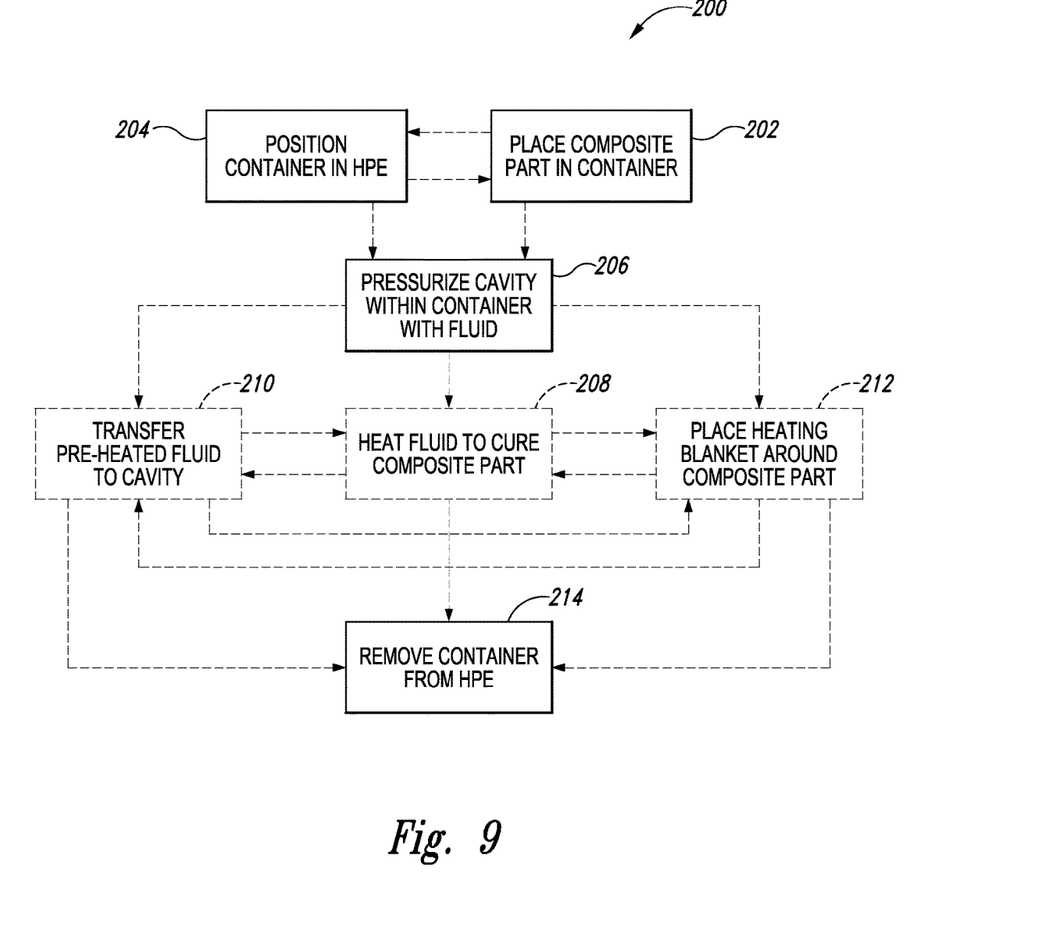
FIG. 9 is a schematic flow diagram of illustrative, non-exclusive examples of methods of curing one or more composite parts according to the present disclosure.
Figure 10:
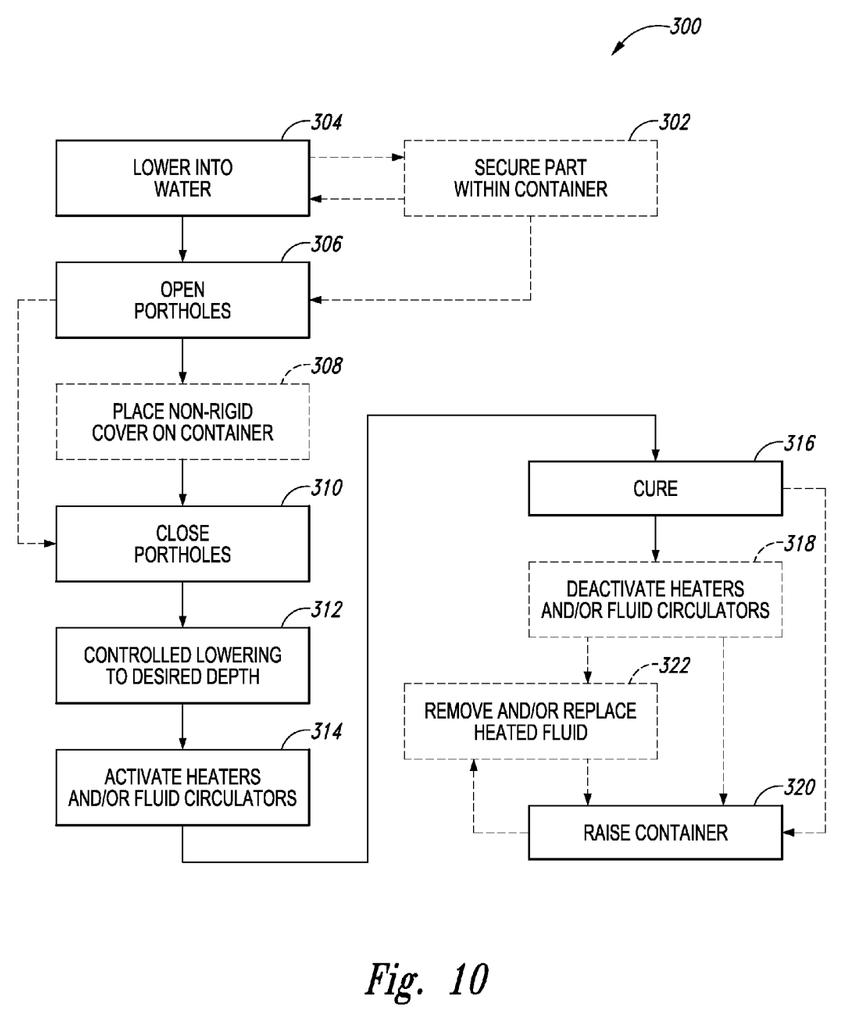
FIG. 10 is a schematic flow diagram of illustrative, non-exclusive examples of methods of curing one or more composite parts according to the present disclosure.

FIGS. 9-10 schematically provide flowcharts that represent illustrative, non-exclusive examples of methods according to the present disclosure. In FIGS. 9-10, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 9-10 are not limiting and other methods and steps are within the scope of the present disclosure, including methods having greater than or fewer than the number of steps illustrated, as understood from the discussions herein.

FIG. 9 illustrates a schematic representation of methods 200 of curing a part in a container that is placed within a pressurized environment according to the present disclosure. One or more composite parts (e.g., composite parts 112) may be placed within a cavity of a container (e.g., a cavity 108 of a container 102) according to the present disclosure, at 202. The container may be positioned within a pressurized environment (abbreviated as "HPE" in FIG. 9), such as a body of water (e.g., volume of liquid 106), at 204. Placing the composite part within the container at 202 may occur before the positioning the container in the pressurized environment at 204, such as while the container is located on a dock, a boat, or a shore, outside of the body of water. In other examples, the container may be positioned in a body of water (i.e., a pressurized environment) at 204, at or near the surface of the water before the composite part is placed in the container at 202 (e.g., the container may float or be held at or near the surface of the body of water while the composite part is being placed in the container). Placing the composite part within the container at 202 may include securing the composite part with respect to the container so that the composite part is substantially still with respect to the container (e.g., composite part 112 may be locked into place using a locking mechanism within container 102). Additionally or alternatively, placing the composite part within the container at 202 may include applying a vacuum bag (e.g., a vacuum bag 126) to the composite part and coupling the vacuum bag to a vacuum system (e.g., a vacuum system 128) within the container, wherein the vacuum bag and the vacuum system are configured to compact the composite part and isolate the part from the gas or liquid in the cavity.

Positioning the container within a pressurized environment at 204 may include placing the container at one or more different configurations, or positions, within the pressurized environment. For example, in a first configuration, the container may be positioned at or near the surface of a body of water (e.g., volume of liquid 106). The container may be configured to float at or near the surface of the water, and/or a raising and lowering mechanism may be coupled to the container to prevent the container from sinking beneath the surface of the water. In a second configuration, the container may be positioned beneath the surface of the water, such as by allowing or forcing the container beneath the surface of the water, to a pre-determined depth, depending on the desired pressure. Thus, the body of water may serve as the pressurized environment, and the entire container may be submerged to a pre-determined depth.

Once the composite part has been placed inside the cavity of the container at 202, the cavity may be pressurized at 206, such as by pressurizing a volume of fluid within the cavity (e.g., a volume of fluid 134 within cavity 108). For example, the fluid may include a portion of the water from the body of water creating the pressurized environment (e.g., cavity 108 may be filled with volume of fluid 134 from volume of liquid 106). In other methods, the fluid may include a volume of gas that is stored outside of the cavity in flexible bladders (e.g., bladders 164) and is forced into the cavity when the bladders are positioned in the body of water along with the container. For example, bladders inflated with air or another gas may be positioned externally to the container, and water pressure from the body of water may compress the bladders, thereby forcing the air or other gas from within the bladders into the cavity when at a sufficient depth within the body of water, thereby pressurizing the cavity. In some methods, pressurizing the cavity at 206 may simply occur passively as the container is submerged within the body of water. For example, the container may include a non-rigid or flexible wall or surface (e.g., a non-rigid wall 116) that is configured to impart pressure from the body of water (i.e., the pressurized environment) to the fluid within the cavity. In this manner, pressure within the cavity may be equal to or approximately equal to the pressure outside of the container, within the pressurized environment.

The composite part may be heated within the cavity while the cavity is pressurized in order to cure the composite part. For example, the fluid within the cavity (e.g., volume of fluid 134, which may completely fill cavity 108 and surround composite part 112) may be heated at 208. Heating the fluid at 208 may include activating a heating system (e.g., a heating system 104) configured to heat the fluid. The heating system may include heating units on board the container (e.g., on-board heating units 135) and/or heating units located remotely from the container (e.g., external heating units 136) may be positioned within the pressurized environment, such as within the body of water, at or near the pre-determined depth at which the container is submerged. In some methods, the heating system may be configured to heat a volume of fluid outside of the container, and the pre-heated fluid may be transferred to the cavity at 210 once the container has been positioned within the pressurized environment at 204. A heating blanket may be placed around the composite part at 212 in some methods, to aid in heating the composite part.

The container may be kept at the pre-determined depth within the pressurized environment for a sufficient time such that the composite part is allowed to cure. Once curing is complete, the container may be removed from the pressurized environment at 214 (e.g., container 102 may be removed from volume of liquid 106, or may be brought to or near the surface 152 of volume of liquid 106), and the cured composite part may be removed from the container. Removing the container from the pressurized environment at 214 may include releasing a mechanism holding the container in place, thereby allowing it to float to the surface. Additionally or alternatively, removing the container from the pressurized environment at 214 may include raising the container to the surface with a raising mechanism, such as a crane (e.g., a crane 148) coupled to the container.

FIG. 10 illustrates a schematic flow diagram of methods 300 of curing a composite part within a container, wherein the container includes one or more port holes formed in one or more walls of the container. Port holes (e.g., port holes 144) may be configured to be selectively sealed and opened, thereby permitting fluid flow between a cavity within the container and outside of the container. In some methods, the composite part may be secured within the container at 302 and the container may be partially lowered into a body of water (e.g., a volume of liquid 106) at 304. For example, lowering the container into the body of water at 304 may include using a raising and lowering mechanism (e.g., a crane 148) to place the container in the body of water, such as at or near the surface of the body of water. The container may be configured to float at or near the surface of the water.

One or more port holes may be opened at 306, thereby allowing fluid to flow into the container. For example, the port holes may be positioned such that, if opened while the container is positioned within the body of water, the port holes may allow the cavity of the container to be filled with fluid (e.g., a volume of fluid 134) flowing in from the body of water (e.g., volume of liquid 106). The container may gradually sink within the body of water as the cavity is being filled with incoming fluid. A raising and lowering mechanism may be configured to control sinking of the container as the cavity is being filled. Once a sufficient volume of fluid is located within the cavity (e.g., once cavity 108 is filled and a bagged composite part 112 is surrounded with volume of fluid 134), the container may be sealed, such as by placing a non-rigid cover or wall (e.g., non-rigid wall 116) on the container at 308 and/or closing the port holes at 310. Closing the port holes at 310 may include sealing the port holes such that the fluid within the cavity is not exchanged with the body of water outside of the container as the container is lowered deeper within the body of water.

The container may be lowered (or allowed to sink) in a controlled manner at 312, to a pre-determined depth within the body of water. In some methods, the controlled lowering at 312 includes lowering the container using a raising and lowering mechanism, such as a crane coupled to the container. Once the container has been lowered at 312 to a depth sufficient to impart a pressurized environment on and in the container, one or more heaters (e.g., on-board heating units 135 and/or external heating units 136) and/or fluid circulators (e.g., fluid circulators 142) may be activated at 314 in order to heat the fluid within the cavity and/or ensure even temperature distribution of heated fluid. The composite part may be allowed to cure at 316, such as by being kept at an elevated temperature in the pressurized environment for a sufficient period of time to cure the composite part. Once curing is complete, the heaters may be deactivated at 318, and the container may be raised to the surface at 320. Raising the container to the surface of the water at 320 may include using a raising mechanism (e.g., a crane 148) coupled to the container to raise the container at or to the surface of the body of water. In some methods, the container may be removed entirely from the body of water. In some methods, the container may rest at or near the surface of the water. The port holes may be re-opened in some methods to allow the fluid to exit the cavity. The cured composite part may be removed from the container, such as by removing or opening a non-rigid wall or lid (e.g., a non-rigid wall 116)

on the container. In some methods, the heated volume of fluid may be removed from the cavity at 322 before the container is raised to the surface of the water at 320.

Illustrative, non-exclusive examples of inventive subject matter according to the present disclosure are described in the following enumerated paragraphs:

A1. A system, comprising:

a container having at least one wall, the container defining a cavity being configured to receive a composite part;

a pressurized environment comprising a volume of liquid, wherein the container is configured to be moved from a first position at least partially outside the pressurized environment to a second position within the pressurized environment, and wherein, in the second position, the volume of liquid surrounds the container and applies a predetermined pressure to the composite part; and a heating system configured to be thermally coupled to the container, wherein the heating system is configured to raise the temperature of at least a portion of a volume of fluid from a first temperature to a curing temperature sufficient to cure the composite part, the curing temperature being higher than the first temperature.

A1.1 The system of paragraph A1, wherein, in the second position, the pressurized environment creates an equal pressure within the cavity and outside the container.

A1.2 The system of any of paragraphs A1-A1.1, wherein the volume of fluid is configured to flow from outside the container into the cavity of the container.

A1.3 The system of any of paragraphs A1-A1.2, wherein the volume of fluid is configured to flow through at least one port hole formed in the container when the container is at least partially placed in the pressurized environment.

A2. The system of any of paragraphs A1-A1.3, wherein, in the second position, the volume of fluid is configured to pressurize the cavity.

A3. The system of any of paragraphs A1-A2, wherein, in the second position, the volume of fluid is configured to pressurize the cavity to at least 90 psi.

A4. The system of any of paragraphs A1-A3, wherein the volume of fluid includes a volume of gas.

A5. The system of any of paragraphs A1-A4, wherein the volume of fluid includes a volume of liquid.

A6. The system of any of paragraphs A1-A5, wherein the volume of fluid includes a volume of gas at least partially stored outside of the container.

A7. The system of paragraph A6, wherein, in the first position, the volume of gas is stored in one or more bladders located externally to the container, the one or more bladders being in flow communication with the cavity of the container.

A8. The system of paragraph A7, wherein the volume of gas is configured to flow into the cavity of the container when the container is in the second position.

A9. The system of any of paragraphs A1-A8, wherein the volume of fluid is configured to fill the cavity of the container.

A10. The system of any of paragraphs A1-A9, wherein the at least one wall includes a removable wall that is selectively removable from the container to provide access to the cavity.

A11. The system of any of paragraphs A1-A10, wherein the heating system includes an external heating unit that is separate from container.

A12. The system of any of paragraphs A1-A11, wherein the heating system includes a fixed heating unit fixedly coupled to container.

A13. The system of any of paragraphs A1-A12, wherein the heating system is positioned at least partially within the cavity of the container.

A14. The system of any of paragraphs A1-A13, wherein the heating system is positioned entirely within the cavity of the container.

A15. The system of any of paragraphs A1-A14, wherein at least a portion of the heating system is integrated with the container.

A16. The system of any of paragraphs A1-A15, wherein the heating system is configured to heat a gas.

A17. The system of any of paragraphs A1-A16, wherein the heating system is configured to heat a liquid.

A18. The system of any of paragraphs A1-A17, wherein the heating system is configured to heat the at least a portion of the volume of fluid before it enters the cavity of the container.

A19. The system of any of paragraphs A1-A17, wherein the heating system is configured to heat the at least a portion of the volume of fluid after it enters the cavity of the container.

A20. The system of any of paragraphs A1-A19, further comprising a heating blanket configured to be positioned around the composite part within the cavity.

A21. The system of paragraph A20, wherein the heating system is configured to heat the heating blanket.

A22. The system of any of paragraphs A20-A21, wherein the heating blanket is filled with a gas and/or a liquid.

A23. The system of any of paragraphs A1-A22, wherein the at least one wall is thermally insulated.

A24. The system of any of paragraphs A1-A23, further comprising a power source electrically coupled to the heating system.

A25. The system of paragraph A24, wherein the power source is located separate from the container.

A26. The system of paragraph A24, wherein the power source is coupled to the container.

A27. The system of paragraph A24, wherein the power source is located within the container.

A28. The system of any of paragraphs A1-A27, further comprising at least one fluid circulator configured to circulate at least a portion of the volume of fluid within the cavity of the container.

A29. The system of paragraph A28, wherein the at least one fluid circulator includes at least one of a fan and a propeller.

A30. The system of any of paragraphs A28-A29 when depending from any of paragraphs A24-A27, wherein the power source is electrically coupled to the fluid circulator.

A31. The system of any of paragraphs A1-A30, further comprising a locking mechanism positioned within the cavity of the container and configured to lock the composite part in place and substantially prevent movement of the composite part with respect to the container.

A32. The system of any of paragraphs A1-A31, wherein the container is configured to be submerged within a body of water.

A33. The system of any of paragraphs A1-A32, wherein the at least one wall includes a semi-flexible wall.

A34. The system of any of paragraphs A1-A32, wherein the at least one wall includes a flexible wall.

A35. The system of any of paragraphs A1-A34, further comprising a vacuum system within the cavity of the container, the vacuum system configured to compact the composite part within the cavity.

A36. The system of any of paragraphs A1-A35, further comprising a crane configured to raise and/or control lowering of the container within the body of water.

A37. The system of any of paragraphs A1-A36, further comprising a temperature sensor configured to monitor temperature conditions within the cavity of the container and deliver information regarding said temperature conditions to a remote location.

A38. The system of any of paragraphs A1-A37, wherein the composite part comprises a composite part for an aircraft.

A39. The system of any of paragraphs A1-A38, wherein the composite part comprises an entire barrel section of an aircraft.

A40. The system of any of paragraphs A1-A38, wherein the composite part comprises an entire barrel of an aircraft.

A41. The system of any of paragraphs A1-A37, wherein the composite part comprises a one-piece composite bridge.

A42. The system of any of paragraphs A1-A37, wherein the composite part comprises a plurality of composite parts.

A43. The system of paragraph A42, wherein the plurality of composite parts include every part needed for an entire vehicle, and wherein the container is configured to receive the plurality of composite parts simultaneously.

A44. The system of any of paragraphs A1-A37, wherein the composite part is an entire hull for a tanker, aircraft carrier, or other vehicle.

A45. The system of any of paragraphs A1-A44, wherein the cavity comprises a first cure chamber and a second cure chamber.

A46. The system of paragraph A45, wherein the first cure chamber and the second cure chamber are selectively in fluid communication with one another.

A47. The system of any of paragraphs A1-A46, further comprising a tether, wherein the tether is configured to provide power to the heating system.

A48. The system of any of paragraphs A1-A47, wherein the pressurized environment is a depth of water.

A49. The system of paragraph A48, wherein the depth of water is a portion of a river, sea, canal, lake, or ocean.

A50. The system of paragraph A48, wherein the depth of water is a man-made hole filled with water.

A51. The system of any of paragraphs A48-A50, wherein the depth of water is at least 170 feet deep.

A52. The system of any of paragraphs A48-A51, wherein the depth of water is at least 307 feet deep.

A53. The system of any of paragraphs A48-A52, wherein the at least one wall includes at least one rigid wall.

A54. The system of any of paragraphs A48-A53, wherein the at least one wall includes at least one non-rigid wall.

A55. The system of any of paragraphs A48-A54, wherein the at least one wall includes a plurality of rigid walls and at least one non-rigid wall.

B1. A method of curing a composite part, comprising:
providing a system according to any of paragraphs A1-A55; and
curing a composite part using the system.

C1. A method of curing a composite part, comprising:
thermally coupling a heating system to a container, wherein the container includes at least one wall defining a cavity, the cavity being configured to receive the composite part, and wherein the heating system is configured to heat a volume of fluid;
inserting the composite part into the cavity;
flowing the volume of fluid into the cavity;
submerging the container under a depth of external liquid such that a predetermined pressure is exerted on the composite part;
heating the volume of fluid via the heating system to a temperature sufficient to cure the composite part; and
curing the composite part.

C1.1 The method of paragraph C1, wherein the at least one wall includes a rigid wall.

C1.2 The method of any of paragraphs C1-C1.1, wherein the at least one wall includes a non-rigid wall.

C1.3 The method of any of paragraphs C1-C1.2, wherein the at least one wall includes a plurality of walls.

C1.4 The method of paragraph C1.3, wherein the container includes at least one port hole extending through one or more of the plurality of walls.

C2. The method of any of paragraphs C1-C1.4, wherein the submerging the container under the depth of external liquid comprises submerging the container under a depth of water.

C3. The method of any of paragraphs C1-C2, wherein the submerging the container under the depth of external liquid comprises submerging the container under at least 170 feet of water.

C4. The method of any of paragraphs C1-C3, wherein the submerging the container under the depth of external liquid comprises submerging the container under at least 307 feet of water.

C5. The method of any of paragraphs C1-C2, wherein the submerging the container under the depth of external liquid comprises submerging the container in ocean water.

C6. The method of any of paragraphs C1-C5, wherein the flowing the volume of fluid into the cavity comprises flowing a volume of gas into the cavity.

C7. The method of any of paragraphs C1-C6, wherein the flowing the volume of fluid into the cavity comprises flowing a volume of nitrogen into the cavity.

C8. The method of any of paragraphs C1-C7, wherein the flowing the volume of fluid into the cavity comprises flowing a volume of liquid into the cavity.

C9. The method of any of paragraphs C1-C8, wherein the flowing the volume of fluid into the cavity comprises flowing a volume of ocean water into the cavity.

C10. The method of any of paragraphs C1-C9, wherein the flowing the volume of fluid into the cavity pressurizes the cavity of the container.

C11. The method of any of paragraphs C1-C10, wherein the inserting the composite part into the cavity comprises locking the composite part to substantially prevent movement of the composite part with respect to the container.

C12. The method of any of paragraphs C1-C11, wherein the composite part is contained within a vacuum bag.

C13. The method of any of paragraphs C1-C12, wherein the heating the volume of fluid is performed before the flowing the volume of fluid into the cavity.

C14. The method of any of paragraphs C1-C12, wherein the heating the volume of fluid is performed after the flowing the volume of fluid into the cavity.

C15. The method of any of paragraphs C1-C14, wherein the heating the volume of fluid is performed after the submerging the container.

C16. The method of any of paragraphs C1-C14, wherein the heating the volume of fluid is performed before the submerging the container.

C17. The method of any of paragraphs C1-C16, wherein the submerging the container comprises controlled lowering of the container into a depth of water, to a predetermined depth.

C18. The method of any of paragraphs C1-C17, wherein the thermally coupling the heating system to the container comprises providing the container with an integrated heating system.

C19. The method of any of paragraphs C1-C8, wherein the thermally coupling the heating system to the container comprises providing a heating system separate from the container.

C20. The method of any of paragraphs C1-C19, wherein the flowing the volume of fluid into the cavity is performed before the submerging the container.

C21. The method of any of paragraphs C1-C20, wherein the flowing the volume of fluid into the cavity is performed after the submerging the container.

C22. The method of any of paragraphs C1-C21, wherein the heating the volume of fluid is performed at a predetermined rate.

C23. The method of any of paragraphs C1-C22, wherein the flowing the volume of fluid into the cavity comprises flowing a fluid through the at least one port hole.

C24. The method of any of paragraphs C1-C23, wherein the container comprises at least one bladder located externally to the container and in fluid communication with the container, wherein the bladder contains a bladder fluid, and wherein the flowing the volume of fluid into the cavity comprises flowing the bladder fluid into the cavity of the container.

C25. The method of paragraph C24, wherein the bladder fluid is a gas.

C26. The method of any of paragraphs C1-C25 wherein the heating the volume of fluid comprises heating a gas.

C27. The method of any of paragraphs C1-C26, wherein the heating the volume of fluid comprises heating a liquid.

C28. The method of any of paragraphs C1-C27, further comprising heating a heating blanket positioned around the composite part.

C29. The method of paragraph C28, wherein the heating blanket is filled with a gas.

C30. The method of any of paragraphs C28-C29, wherein the heating blanket is filled with a liquid.

C31. The method of any of paragraphs C1-C30, further comprising thermally insulating the at least one wall of the container.

C32. The method of any of paragraphs C1-C31, further comprising supplying electrical power to the heating system via a power source.

C33. The method of paragraph C32, further comprising electrically de-coupling the power source from the heating system to remove power from the heating system.

C34. The method of any of paragraphs C1-C33, further comprising cooling the volume of fluid in the cavity.

C35. The method of any of paragraphs C1-C34, further comprising removing at least a portion of the volume of fluid from the cavity.

C36. The method of paragraph C35, further comprising replacing the volume of fluid in the cavity with a second volume of fluid.

C37. The method of any of paragraphs C1-C36, further comprising providing a fluid circulator within the cavity, the fluid circulator being configured to circulate fluid within the cavity.

C38. The method of paragraph C37, wherein the fluid circulator comprises a fan.

C39. The method of any of paragraphs C37-C38, wherein the fluid circulator comprises a propeller.

C40. The method of any of paragraphs C1-C39, further comprising raising the container out of the depth of external liquid.

C41. The method of any of paragraphs C1-C40, further comprising removing the composite part from the cavity after the curing the composite part.

C42. The method of any of paragraphs C1-C41, wherein the curing the composite part comprises leaving the container under the depth of external liquid for a sufficient period of time such that the composite part is kept at a sufficient temperature and pressure for a sufficient amount of time in order to effect curing of the composite part.

C43. The method of any of paragraphs C1-C42, wherein the cavity of the container comprises a first cure chamber and a second cure chamber, wherein the first cure chamber is in selective fluid communication with the second cure chamber, wherein the flowing the volume of fluid into the cavity comprises flowing the volume of fluid into the first cure chamber, wherein the heating the volume of fluid comprises heating the volume of fluid in the first cure chamber, and wherein the curing the composite part comprises curing a first composite part located within the first cure chamber, the method further comprising flowing the volume of fluid from the first cure chamber into the second cure chamber, and curing a second composite part located in the second cure chamber.

C44. The method of any of paragraphs C1-C43, wherein the composite part comprises a composite part for an aircraft.

C45. The method of any of paragraphs C1-C44, wherein the composite part comprises a complete barrel of an aircraft.

C46. The method of any of paragraphs C1-C45, wherein the composite part comprises a plurality of composite parts.

C47. The method of any of paragraphs C1-C46, wherein the composite part comprises an entire hull for a tank or aircraft carrier vehicle.

C48. The method of any of paragraphs C1-C47, further comprising monitoring the temperature of the volume of fluid within the cavity using one or more thermocouples.

C49. The method of any of paragraphs C1-C48, wherein the composite part comprises a single-piece composite bridge.

C50. The method of paragraph C49, further comprising tugging the single-piece composite bridge to a final destination.

C51. The method of any of paragraphs C1-C50, wherein the predetermined pressure is at least 90 psi.

C52. The method of any of paragraphs C1-C51, wherein the predetermined pressure is at least 150 psi.

D1. A method of curing a composite part, comprising:
inserting a composite part into a cavity of a container, the container being configured to receive the composite part, the container including a plurality of rigid walls defining the cavity and at least one non-rigid wall, the non-rigid wall being removable from the plurality of rigid walls, wherein at least one of the plurality of rigid walls includes a port hole extending through the at least one of the plurality of rigid walls;
removably sealing the non-rigid wall onto the plurality of rigid walls;
lowering the container into a body of water;
opening the port hole to allow water from the body of water to flow into the cavity;
preventing the container from uncontrolled sinking below a surface of the body of water;

allowing the cavity of the container to be filled with water flowing in through the port hole;

sealing the port hole after the allowing the cavity of the container to be filled with water;

lowering the container to a pre-determined depth in the body of water;

curing the composite part by heating the water in the cavity to a predetermined temperature; and raising the container to a surface of the body of water after the curing the composite part.

D2. The method of paragraph D1, wherein the inserting a composite part into the cavity comprises inserting a bagged composite part into the cavity.

D3. The method of any of paragraphs D1-D2, further comprising securing the composite part in place within the cavity.

D4. The method of any of paragraphs D1-D3, wherein the lowering the container comprises lowering the container using a crane.

D5. The method of any of paragraphs D1-D4, wherein the body of water is at least one of: an ocean, a sea, a river, a lake, a canal, a man-made hole filled with water, and a bay.

D6. The method of any of paragraphs D1-D5, wherein the port hole comprises a plurality of port holes formed in various locations in one or more of the plurality of rigid walls.

D7. The method of any of paragraphs D1-D6, further comprising activating one or more fluid circulators configured to circulate the water within the cavity for uniform temperature distribution.

D8. The method of any of paragraphs D1-D7, wherein the lowering the container to a pre-determined depth comprises lowering the container to a sufficient depth such that the water within the cavity is at a pressure of at least 150 psi.

D9. The method of any of paragraphs D1-D8, further comprising removing heat from the water within the cavity.

D10. The method of any of paragraphs D1-D9, further comprising opening the port hole after the lowering the container to the pre-determined depth and before the raising the container to the surface.

D11. The method of any of paragraphs D1-D10, further comprising removing the non-rigid wall and removing the composite part from the cavity.

E1. A composite part cured according to any of the methods of paragraphs B1, C1-C52, or D1-D11.

F1. An aircraft comprising a composite part cured according to any of the methods of paragraphs B1, C1-C52, or D1-D11.

G1. A composite part cured using the system according to any of paragraphs A1-A55.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of curing a composite part, the method comprising:
   thermally coupling a heating system to a container, the container comprising at least one wall, the at least one wall defining a cavity configured to receive the composite part, wherein the heating system is configured to heat a volume of fluid;
   inserting the composite part into the cavity;
   flowing the volume of fluid into the cavity;
   submerging the container under a depth of external liquid such that a predetermined pressure is exerted on the composite part;
   heating the volume of fluid via the heating system to a temperature sufficient to cure the composite part; and
   curing the composite part.

2. The method according to claim 1, wherein the submerging the container under the depth of external liquid comprises submerging the container under at least 170 feet (51.8 m) of water.

3. The method according to claim 1, wherein the flowing the volume of fluid into the cavity comprises flowing a volume of gas into the cavity.

4. The method according to claim 1, wherein the flowing the volume of fluid into the cavity comprises flowing a volume of liquid into the cavity.

5. The method according to claim 1, further comprising raising the container out of the depth of external liquid and removing the composite part from the cavity after the curing the composite part.

6. The method according to claim 1, wherein the curing the composite part comprises leaving the container under the depth of external liquid for a sufficient period of time such that the composite part is kept at a sufficient temperature and pressure for a sufficient amount of time in order to effect the curing of the composite part.

7. A method of curing a composite part, the method comprising:
   inserting the composite part into a cavity of a container, the container comprises a plurality of rigid walls defining the cavity and at least one non-rigid wall, the non-rigid wall being removable from the plurality of rigid walls, wherein at least one of the plurality of rigid walls comprises a port hole extending through the at least one of the plurality of rigid walls;

removably sealing the non-rigid wall onto the plurality of rigid walls;

lowering the container into a body of water;

opening the port hole to allow water from the body of water to flow into the cavity;

controlling the descent of the container to a predetermined depth below a surface of the body of water;

allowing the cavity of the container to be filled with water flowing in through the port hole;

sealing the port hole after the allowing the cavity of the container to be filled with water;

curing the composite part by heating at least a portion of the water in the cavity to a predetermined temperature;

raising the container to the surface of the body of water after the curing the composite part; and draining the water from the cavity of the container before removing the composite part from the cavity.

8. The method according to claim 7, further comprising activating one or more fluid circulators configured to circulate the water within the cavity for uniform temperature distribution.

9. The method according to claim 1, wherein the heating the volume of fluid is performed after the flowing the volume of fluid into the cavity.

10. The method according to claim 1, wherein the heating the volume of fluid is performed while the volume of fluid is in the cavity.

11. The method according to claim 1, wherein the heating system comprises an on-board heating unit positioned within the cavity, and wherein the heating the volume of fluid comprises heating the volume of fluid with the on-board heating unit.

* * * * *